United States Patent [19]

Klerken

[11] Patent Number: 4,750,004

[45] Date of Patent: Jun. 7, 1988

[54] MAGNETIC HEAD ARRAY

[75] Inventor: Pierre A. M. Klerken, Venlo, Netherlands

[73] Assignee: Oce-Nederland B.V., Venlo, Netherlands

[21] Appl. No.: 16,271

[22] Filed: Feb. 19, 1987

[30] Foreign Application Priority Data

Feb. 26, 1986 [NL] Netherlands ......................... 8600478

[51] Int. Cl.[4] ............................................. G01D 15/00

[52] U.S. Cl. ................................. 346/74.5; 346/74.20

[58] Field of Search ................. 346/74.5, 139 C, 74.2; 360/110, 122, 123, 125, 126; 400/119; 101/DIG. 5; 358/301

[56] References Cited

U.S. PATENT DOCUMENTS 4,291,314 9/1981 Nathan et al. ..................... 346/74.5

*Primary Examiner*—Arthur G. Evans

*Attorney, Agent, or Firm*—Reed Smith Shaw & McClay

[57] ABSTRACT

A magnetic head array for use in a magnetographic printer, in which local magnetic fields are generated by U-shaped wires each having a complete magnetic yoke formed by bending a foil made up of alternative parallel conductive and soft-magnetic wires over a thin sheet of soft-magnetic material.

In a magnetographic printer the array is brought into contact at the U-shape bend with a magnetizable medium. The areas magnetized by the individual wires are sharply defined.

15 Claims, 2 Drawing Sheets

MAGNETIC HEAD ARRAY

FIELD OF THE INVENTION

The present invention relates to a device for magnetizing a magnetizable medium to a pattern of points situated on a line, and, in particular, to an array having a number of parallel inverted "U"-shaped conductors which can be independently connected to an electrical power supply to magnetize the medium.

BACKGROUND OF THE INVENTION

Magnetic heads are generally well known and are used for high resolution printing and other applications. For example, magnetic printing heads are disclosed in U.S. Pat. Nos. 4,291,314; 4,328,503 and 4,370,661. The patents generally disclose printed circuit boards with parallel conductors on the surface and a high permeability magnetic comb structure extending between the conductors to form a magnetic yoke around each conductor. These magnetic combs can be made by electrodeposition.

As disclosed, the printed circuits are flexible and generally positioned over subtrates which can be flat or slightly arcuate. However, these printing heads involve complicated structure and straight conductors which do not necessarily provide good resolution in the direction of the conductors.

It is also know from U.S. Pat. No. 4,097,871 to surround wires with a soft-magnetic material, the embodiment described therein has a very complex design, and its construction requires very great care. It moreover is difficult to achieve compaction of the magnetizing elements to achieve the resolution required in conventional printers. Finally, the conductive wires are substantially straight so that the magnetic field is poorly defined in a direction parallel to the direction of movement of the medium.

Another type of printing head is disclosed in UK Pat. No. 806,288. In this device, which is used in a magnetographic printer, parallel conductive wires are bent at regular intervals around a sheet of dielectric nonmagnetic material. The bent part is brought into contact with the magnetizable medium and then a strong current is fed for a brief time through selected wires to generate a magnetic field around said wires sufficient to locally magnetize the medium.

A disadvantage of this device is that a very high current strength is required to obtain a magnetic field strong enough to magnetize the medium. Extensive apparatus is required for switching the current on and off. If wires are positioned very close together as is customary in the printer art to obtain high resolution, there is a great risk that the wires will influence one another. Such influencing becomes visible when the magnetic image is subsequently converted to a visible image. Additionally, high currents cause heat to be developed in the wires which limits the duration and frequency of current pulses required to produce an image.

Another disadvantage of the device is that the magnetic field of the wires, and hence the magnetized area on the medium, is not sharply defined. Because the size of the magnetized area cannot be adequately controlled, the density of the magnetized areas that can be achieved in practice is low.

Accordingly, it is an object of the present invention to obviate the disadvantages of the type of printing array disclosed in UK Pat. No. 806,288.

SUMMARY OF THE INVENTION

Generally, the present invention comprises a magnetic head array in which the space enclosed by U-shaped conductors and the spaces between the conductors are filled with a soft-magnetic material. The conductors at the point of the bend are substantially enclosed by a closed a circle of magnetizable material which acts as a magnetic yoke. As a result, the magnetic field is concentrated in a smaller area so that a lower current strength can be used, while at the same time a sharply defined magnetized area in the medium is achieved.

According to a preferred embodiment of the invention, the head is constructed from a foil, formed by parallel wires secured to one another to form alternately positioned conductive wire and soft-magnetic material. The foil is bent over the edge of a sheet of soft-magnetic material having a thickness corresponding substantially to the diameters of the conductor wires and insulated therefrom. This embodiment affords a magnetic head that can be easily made yet has a high precision and a greater density of magnetizing elements. The preferred embodiment can also be made flexible enough to ensure good contact between the magnetizing elements and the magnetizable medium. In addition, the soft-magnetic material acts as a sink for the heat generated by the current in the conductors so that a high pulse frequency is possible. Other advantages of the invention will be apparent from the following description of presently preferred embodiments taken with reference to the accompanying drawings.

PRESENTLY PREFERRED EMBODIMENT

Figure 1:
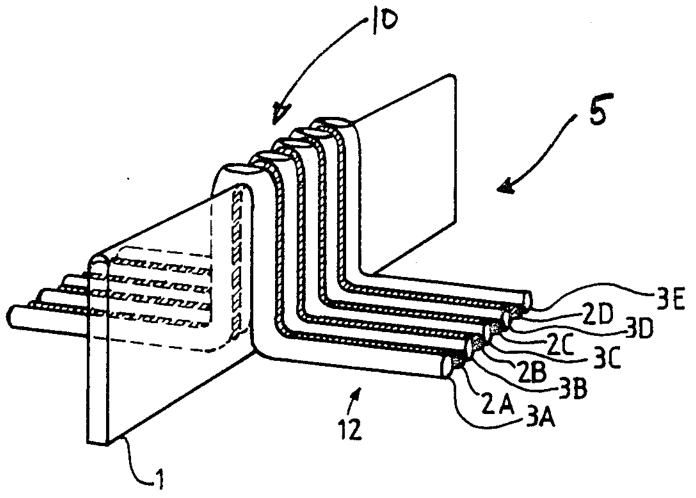
FIG. 1 is a perspective view of a partially contructed magnetic head array according to the invention.
Figure 3:
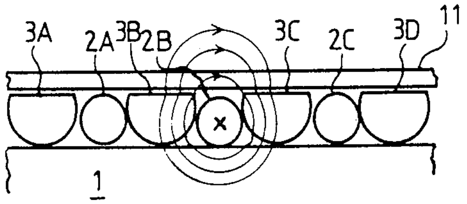
FIG. 3 is a diagram illustration of the operating principle of the invention.
Figure 4:
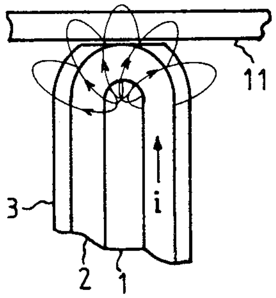
FIG. 4 is another diagram showing the principle of operation of the heat.

FIG. 1 represents part of the magnetic head 5 according to the invention. A set of wires consisting alternately of a conductive material, wires 2A to 2D, and a soft-magnetic material, wires 3A to 3E, are bent over the edge of strip 1 of soft-magnetic material. Conductor wires 2A to 2D are preferably thinner than magnetic wires 3A to 3E. The latter, however, are ground flat at points 10 where they are bent about the edge of strip 1 so that they do not project above the conductor wires. This is In a magnetographic printer, magnetizing head 5 is brought into a contact at points 10 with a magnetizable medium 11. Medium 11 is generally a magnetizable layer, e.g., a Co-Ni-P layer, applied electrolytically to a metal support. When a current is passed through selected wires, e.g., wire 2B, as represented in FIG. 3, a magnetic field will form with substantially circular field lines concentric to the cross-section of the current-carrying wires. This magnetic field can magnetize magnetizable layer 11 in a direction lying in the plane of the layer. The part of layer 1 that is magnetized is sharply defined in a direction perpendicular to the direction of the wires by the focusing action of the soft-magnetic wires lying next to the current-carrying wire and soft-magnetic strip 1. There are no focusing elements in the direction parallel to the direction of the wires, but since the wires are bent sharply about strip 1 their respective areas of operation in the magnetizable layer 11 is restricted as represented in FIG. 4, in which only a few field lines are illustrated. In this way, small magnetized domains are sharply defined in both directions in magnetizable layer 11. By moving the layer over magnetizing head 5 and passing current through the individual wires at the correct times, it is possible to apply a two-dimensional magnetic image into the layer. This magnetic image can be converted then into a visible image, such as in the manner specified in UK Pat. No. 806,288.

The accuracy required in the construction of the magnetizing device is easily achieved, for example, by the production method described hereinafter.

Figure 2A:
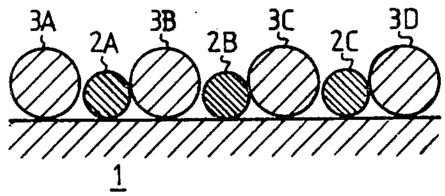
FIG. 2A is a cross-section through the device along a plane through the strip of soft-magnetic material before the conductor wires are ground down in accordance with the preferred practice.
Figure 2B:
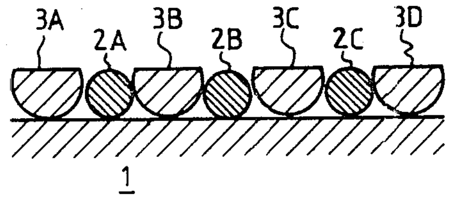
FIG. 2B is a similar cross-section as shown in FIG. 2A but after the conductor wires have been ground.

A spiral groove with a pitch of 60μ, for example, is cut in a smooth aluminum roller by means of a diamond chisel. A conductive insulated wire with a diameter of 25μ, for example, is then wound around the roller so that the wire follows the groove. A wire of soft-magnetic material having a diameter of 35μ, for example, is then wound in the space between the consecutive windings. The entire winding is then covered with a thin layer of epoxy resin or some other suitable substance which anchors the wires together so that they together form foil 12. This foil is cut and removed from the roller. Foil 12 is then bent about a strip of preferably very thin soft-magnetic material 1. Preferably, its thickness is in the order of the diameters of the wires. As described above, it is desirable that soft-magnetic wires 3A–3E be thicker than the conductive wires 2A–2E and thus project slightly above them. The projecting parts are ground down at points 10 as represented in FIG. 2B.

In this way, it is possible to make the air gaps between the soft-magnetic wires and the medium for magnetization as small as possible, thus minimizing field strength losses.

The ends of the conductive wires are finally connected to switchable electrical power supplies, the number of power supplies only being restricted by known multiplexing techniques.

Figure 5:
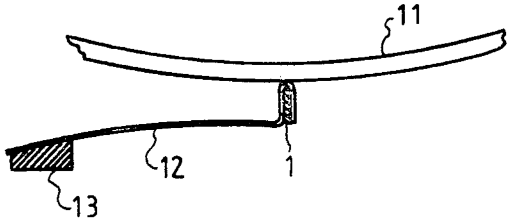
FIG. 5 is a diagrammatical representation of a special embodiment of the magnetic head array according to the invention.

Although the above-described embodiment is constructed from separate wires of conductive and soft-magnetic material alternately, the invention is not restricted thereto. Other embodiments are also possible, e.g., a sheet of soft-magnetic material in which grooves are formed and then filled with conductive material separated from the soft-magnetic material by an insulating layer, the sheet then being bent about the edge of a second sheet of soft-magnetic material. The second sheet of soft-magnetic material can even be left out because the soft-magnetic material of the first sheet remaining beneath the grooves will fulfill the function of the The production method described enables a resilient magentic head array to be produced, using the resilient properties of the foil, such array always bearing snugly against the medium for magnetization, as shown in FIG. 5. Here one end of the foil 12 as considered in the direction of the wires projects outside the device and is secured to a baseplate 13, while the part that forms magnetizing head 5 together with the soft-magnetic strip 1 is cantilevered and rests with the bend against the medium 11 for magnetization. Baseplate 13 is so disposed that the wires are somewhat bent and hold the magnetizing device pressed against the medium by their resiliency.

Of course the pressing effect can also be obtained by pressing the device against the medium for magnetization by other means, e.g., a spring, a resilient medium or air pressure, using the flexible properties of the foil.

While presently preferred embodiments of the invention have been shown and described in particularity, it may be otherwise embedded within the scope of the appended claims.

What is claimed is:

1. A magnetic head array for magnetizing in a magnetizable medium a pattern of points situated along a line comprising a plurality of parallel spaced apart conductors insulated from one another and adapted to be independently connected to sources of electricl energy, soft-magnetic material positioned between said conductors to form an array of alternating wires and magnetic material, said array being sharply bent to form a substantially "U"-shaped structure which causes sharply defined magnetized areas in the direction of the conductors.

2. A magnetic head array according to claim 1, including a thin sheet of soft-magnetic material having a thickness of about the diameter of said conductive wires, wherein said array of parallel wires and soft-magnetic material is formed into a foil and bent over the edge of said sheet of soft-magnetic material.

3. A magnetic head array according to claim 1, wherein said array of alternating wires and soft-magnetic material is formed by parallel wires of alternately conductive and soft-magnetic material anchored to one another but insulated from one another, said array being bent over the edge of a thin sheet of soft-magnetic material having a thickness of about the diameters of the conductive wires, but insulated from the conductive wires.

4. A magnetographic printer for the image-wise magnetization of a magnetizable medium in the form of a layer and converting said magnetic image into an image on a receiving material, comprising a magnetic head array according to claim 1 for the image-wise magnetization of said medium.

5. Apparatus for the point-wise magnetization of a magnetizable medium, characterized in that said magnetic head array according to claim 1 is used for magnetization of said medium, wherein said head array is formed into a foil of alternating wires and soft-magnetic material, said foil being bent over thin strip of soft-magnetic material, but insulated therefrom and projecting from one side of said strip in the direction of said wires, whereby the end of the said projecting part of the foil is secured to a fixed point in said apparatus such that the head rests against said medium against the resilience of the projecting part of the foil.

6. A magnetic head array for magnetizing in a magnetizable medium a pattern of points situated along a line comprising a plurality of parallel spaced apart conductors insulated from one another and adapted to be independently connected to sources of electrical energy, soft-magnetic material positioned between said conductors to form an array of alternating wires and magnetic material, said array being formed into a foil and bent to form a substantially "U"-shaped structure over the edge of a thin sheet of soft-magnetic material having a thickness of about the diameter of said conductive wires.

7. A magnetic head array according to claim 6, wherein said array of alternating wires and soft-magnetic material is formed by parallel wires of alternately conductive and soft-magnetic material anchored to one another, the conductive wires being insulated from one another.

8. Apparatus for the point-wise magnetization of a magnetizable medium, wherein said magnetic head array according to claim 6 is used for magnetization of said medium and wherein the foil projects from one side of said sheet in the direction of said wires, whereby the end of the said projecting part of the foil is secured to a fixed point in said apparatus such that the head rests against said medium against the resilience of the projecting part of the foil.

9. A magnetographic printer for the image-wise magnetization of a magnetizable medium in the form of a layer and converting said magnetic image into an image on a receiving material, comprising a magnetic head array according to claim 6 for the image-wise magnetization of said medium.

10. A magnetographic printer for the image-wise magnetization of a magnetizable medium in the form of a layer and converting said magnetic image into an image on a receiving material, comprising a magnetic head array according to claim 7 for the image-wise magnetization of said medium.

11. A magnetic head array for magnetizing in a magnetizable medium a pattern of points situated along a line comprising a plurality of parallel space apart conductors insulated from one another and adapted to be independently connected to sources of electrical energy, soft-magnetic material positioned between said conductors to form a foil of alternating wires and magnetic material, said foil being sharply bent to form a substantially "U"-shaped structure wherein the space enclosed by the "U"-shaped structure is filled with a soft-magnetic material.

12. A magnetic head array according to claim 11, wherein the soft-magnetic material enclosed by the "U"-shaped structure is a thin sheet of soft-magnetic material having a thickness of about the diameter of said conductive wires, wherein said foil of parallel wires and soft-magnetic material is bent over the edge of said sheet of soft-magnetic material.

13. A magnetic head array according to claim 11, wherein said foil of alternating wires and soft-magnetic material is formed by parallel wires consisting alternately of conductive and soft-magnetic material anchored to one another, said array being bent over the edge of a thin sheet of soft-magnetic material having a thickness of about the diameters of the conductive wires, the conductive wires being insulated from one another.

14. A magnetographic printer for the image-wise magnetization of a magnetizable medium in the form of a layer and converting said magnetic image into an image on a receiving material, comprising a magnetic head array according to claim 11 for the image-wise magnetization of said medium.

15. Apparatus for the point-wise magnetization of a magnetizable medium, comprising a magnetic head array acording to claim 11 for magnetization of said medium, wherein said head array comprises a foil of alternating conductive wires insulated from one another and soft-magnetic material, said foil being bent over a thin strip of soft-magnetic material projectng from one side of said strip in the direction of said wires, whereby the end of the said projecting part of the foil is secured to a fixed point in said apparatus such that the head rests against said medium against the resilience of the projecting part of the foil.

* * * * *

UNITED STATES PATENT AND TRADEMARK OFFICE
CERTIFICATE OF CORRECTION

PATENT NO. : 4,750,004
DATED : June 7, 1988
INVENTOR(S) : Klerken

It is certified that error appears in the above—identified patent and that said Letters Patent is hereby corrected as shown below:

Column 2, line 42: please delete --heat-- and substitute "head" therefor.

Column 2, line 56: please insert "represented in Figure 2B." after "This is".

Column 3, line 7: please delete --1-- and substitute "11" therefor.

Column 3, line 65: please insert "second sheet by simply folding the first sheet in two." after "of the".

Column 4, line 16: please delete --embedded-- and substitute "embodied" therefor.

Column 5, line 35: please delete --space-- and substitute "spaced" therefor.

Column 6, line 33: please delete --projectng-- and substitute "projecting" therefor.

Signed and Sealed this

Sixth Day of December, 1988

*Attest:*

DONALD J. QUIGG

*Attesting Officer*

*Commissioner of Patents and Trademarks*